United States Patent
Otsuka

[19]

[11] Patent Number: 6,104,284
[45] Date of Patent: Aug. 15, 2000

[54] ROLL OVER DETERMINING METHOD

[75] Inventor: Takuya Otsuka, Numazu, Japan

[73] Assignee: Toyota Jidosha Kabushiki Kaisha, Toyota, Japan

[21] Appl. No.: 09/332,170

[22] Filed: Jun. 14, 1999

[30] Foreign Application Priority Data

Jun. 19, 1998 [JP] Japan .................................. 10-173109

[51] Int. Cl.$^7$ ................................................. B60Q 1/00
[52] U.S. Cl. .......................... 340/440; 340/429; 340/438; 340/436; 200/61.45 R; 200/61.52; 200/52 A; 280/735; 280/734; 701/45
[58] Field of Search .................................. 340/429, 438, 340/436, 440; 200/61.45 R, 61.52, 52 A; 280/735, 734; 701/45

[56] References Cited

U.S. PATENT DOCUMENTS

| | | | |
|---|---|---|---|
| 5,029,473 | 7/1991 | Jost et al. | 73/516 |
| 5,261,506 | 11/1993 | Jost | 180/282 |
| 5,428,534 | 6/1995 | Wetzel et al. | 364/424.05 |
| 5,610,575 | 3/1997 | Gioutsos | 340/429 |
| 5,623,246 | 4/1997 | Kruce et al. | 340/438 |
| 5,779,264 | 7/1998 | De Mersseman et al. | 280/735 |
| 5,788,270 | 8/1998 | HAland et al. | 280/729 |
| 5,806,008 | 9/1998 | Takeuchi | 701/45 |
| 5,872,536 | 2/1999 | Lyons et al. | 342/70 |

FOREIGN PATENT DOCUMENTS

| | | | |
|---|---|---|---|
| 6-297985 | 10/1994 | Japan | B60K 41/20 |
| 9-240399 | 9/1997 | Japan | B60R 21/02 |

*Primary Examiner*—Daniel J. Wu
*Assistant Examiner*—Tai T. Nguyen
*Attorney, Agent, or Firm*—Pillsbury Madison & Sutro LLP

[57] ABSTRACT

A control circuit determines that a vehicle is in a turning mode. A roll rate sensor then detects the roll rate (RR) and determines whether or not the roll rate exceeds a threshold value. If it is determined that the roll rate does exceed the threshold value, then it is determined that the vehicle is in a roll over state if the relationship between the sideways acceleration (Gy) and the roll angle (RA) falls inside the roll over determining area of a determining map stored in advance in the control circuit. Accordingly, the roll over state of the vehicle is detected early.

13 Claims, 8 Drawing Sheets

ROLL OVER DETERMINING METHOD

BACKGROUND OF THE INVENTION

1. Field of the Invention

The present invention relates to a roll over determining method and particularly to a roll over determining method which determines whether or not a vehicle is going to roll over on the basis of the degree to which the vehicle rolls.

2. Description of the Related Art

The technology disclosed in Japanese Patent Application Laid-Open (JPA) 9-240399 is known as a technology for determining whether or not a vehicle is going to roll over.

Figure 8:
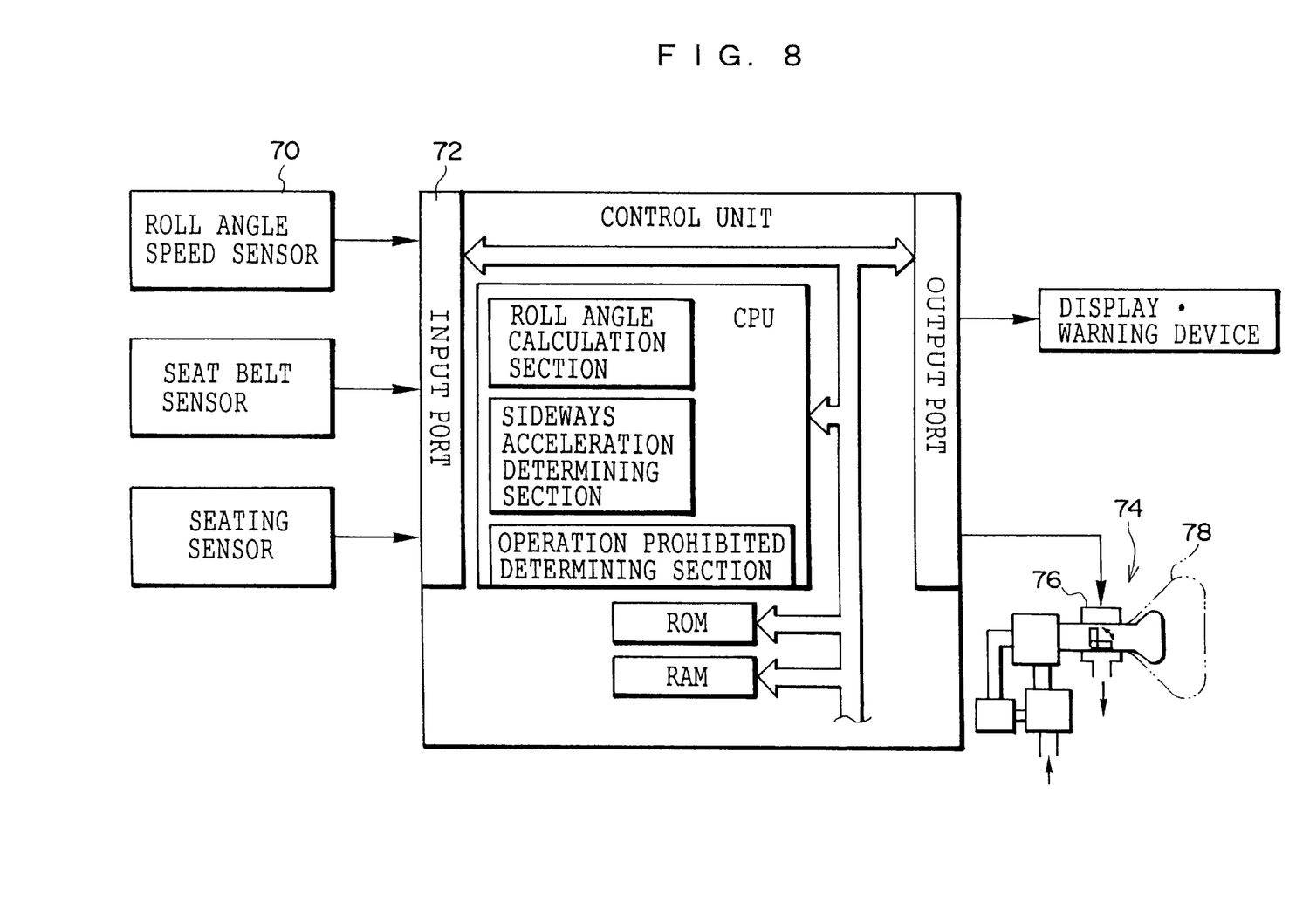
FIG. 8 is a schematic side view showing a control system in a conventional roll over determining method.

As is shown in FIG. 8, in this technology a roll angle sensor detects that the vehicle is in a roll state. When the vehicle rolls with more than or equal to a predetermined roll rate and the roll angle thus exceeds an upper limit, an instruction is given from an input port 72 to a high-speed control valve 76 of a posture maintaining air bag device 74 (also called a side air bag device) to open the high-speed control valve 76. As a result, high-pressure air flows into the air bag body 78, the air bag body 78 expands, and the position of the passenger seated in the front passenger's seat is maintained. If, however, for example, the acceleration in the sideways direction is small, or the passenger is wearing their seat belt, or is not seated in the seat, then the posture maintaining airbag device 74 is placed in a non-operational state. It is also possible to set the operating conditions of the posture maintaining airbag device 74 from the roll rate and the roll angle.

However, in the aforementioned technology, the operating space of the posture maintaining airbag device 74 is determined using a determining map of the roll rate and the roll angle. Therefore, when a vehicle rolls over while the vehicle occupant is being swung towards the outer side of the vehicle in the transverse direction thereof by the sideways acceleration that is generated when a vehicle turns, this sideways acceleration is not included as an element for determining the operation of the posture maintaining airbag device 74. Accordingly, at the point when the posture maintaining airbag device 74 begins operating, the gap between the vehicle occupant and the side of the vehicle, in other words, the space for the airbag to expand into, has already become greatly lessened, with the result that, practically speaking, the detection can be said to have happened too late.

SUMMARY OF THE INVENTION

In consideration of the above, it is an object of the present invention to provide a roll over determining method which can detect the early stages of roll over.

The roll over determining method according to the first aspect of the present invention comprises: a turning mode determining step for determining whether or not a vehicle is turning; a roll rate determining step for determining whether or not the roll rate of the vehicle exceeds a predetermined value; and a roll over determining step for determining whether or not the vehicle is in a roll over state, wherein if it is determined in the turning mode determining step that the vehicle is turning and it is determined in the roll rate determining step that the roll rate exceeds the predetermined value, the determining of the roll over determining step is executed on the basis of the relationship between a sideways acceleration of the vehicle and a roll angle of the vehicle.

Accordingly, in the turning mode determining process, it is determined whether a vehicle is turning around or not. If it is determined that the vehicle is turning (is in turning mode), then it is determined in the roll rate determining process whether or not the roll rate has exceeded a predetermined value (a threshold value). If it is determined that the roll rate has exceeded the threshold value, then it is determined in the roll over determining process whether the vehicle is going to roll over or not on the basis of the relation ship between the sideways acceleration and the roll angle. As a result, when the vehicle is in turning mode, sideways acceleration is added to the elements determining whether or not a vehicle is going to roll over and, therefore, the side swing of the vehicle occupant caused by the sideways acceleration is taken into consideration. Accordingly, vehicle roll over can be detected early. This enables, for example, the side airbag to be operated before the vehicle occupant is swung towards the outer side of the vehicle in the transverse direction by the turning of the vehicle and the space between the vehicle occupant and the side of the vehicle narrows.

In the roll over determining method according to the second aspect of the present invention, the roll over determining process is performed when the roll rate reverses.

When a vehicle rolls over while turning, firstly the vehicle begins to roll with respect to the sprung weight of the vehicle. After that, as the vehicle turns further, the vehicle next begins to roll with respect to the unsprung weight of the vehicle. As a result of this the roll rate is reversed. Whether or not the vehicle eventually rolls over depends on the sideways acceleration and roll angle at that moment. The passenger is swung towards the outer side of the vehicle in the transverse direction thereof by the sideways acceleration generated slightly after the roll rate reversal.

Accordingly, by determining whether or not the vehicle is going to roll over by the timing of the roll rate reversal, it can be reliably detected that the vehicle is going to roll over before the gap between the vehicle occupant and the side of the vehicle changes.

DESCRIPTION OF THE PREFERRED EMBODIMENTS

The roll over determining method of the first embodiment of the present invention will now be explained according to FIGS. 1–7.

Note that the arrows FR and UP in the figures refer respectively to the frontwards direction of the vehicle and the upwards direction of the vehicle.

Figure 3:
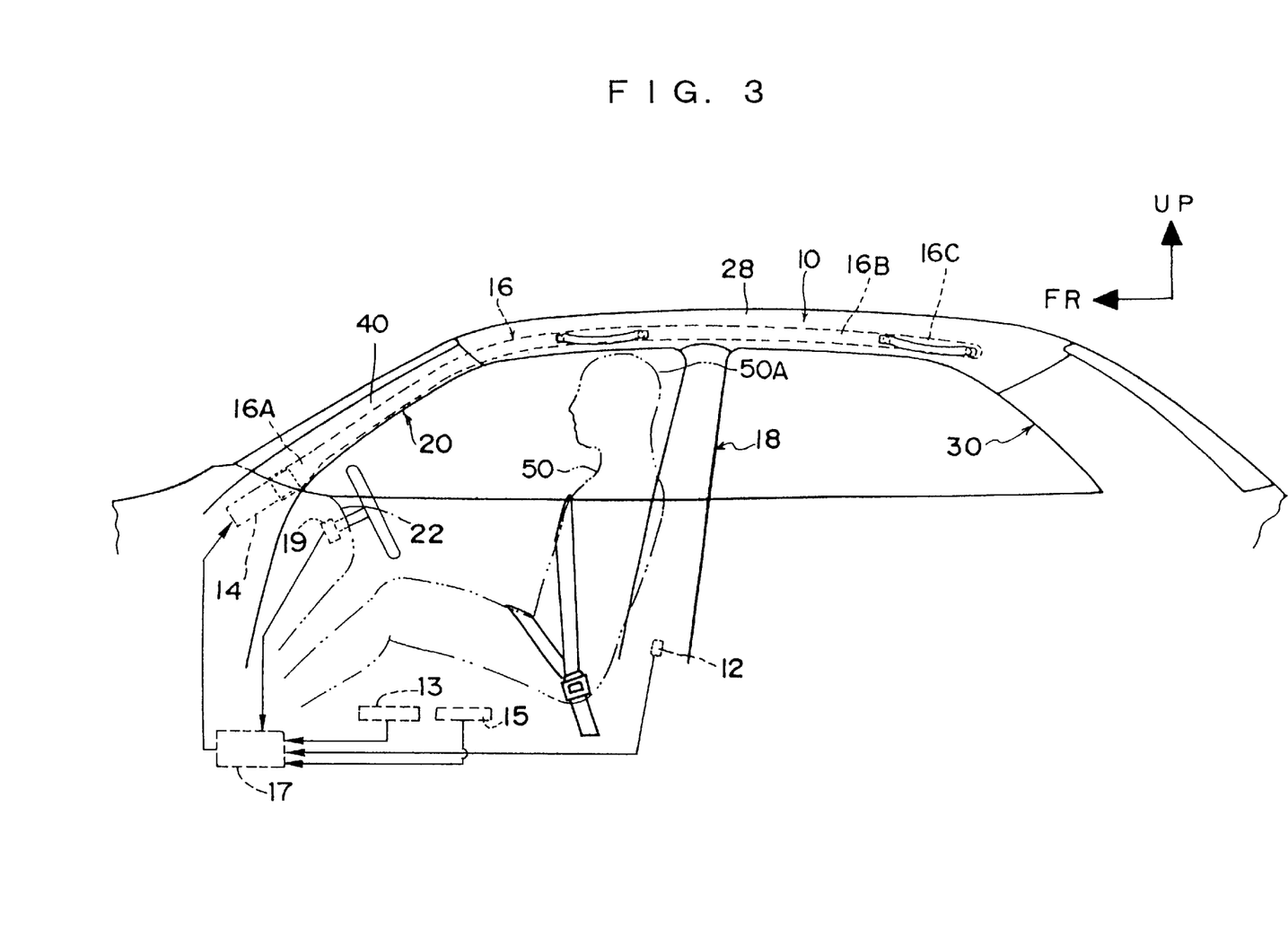
FIG. 3 is a schematic structural diagram showing the positions where the essential elements of the control system in the roll are disposed as seen from the side in the roll over determining method according to the first embodiment of the present invention.

As is shown in FIG. 3, the control system of the present embodiment is equipped with a head-protecting air bag device 10. The air bag device 10 is provided with a side impact sensor 12 for detecting a side impact, an inflator 14 for operating to eject gas, an air bag body 16 for protecting a head portion folded in a predetermined fashion, and a control circuit 17 for controlling the operation of the inflator 14.

In addition, the control system of the present embodiment is equipped with a roll rate sensor 13 for detecting the roll which is the motion of the vehicle in a sideways direction, a sideways acceleration sensor 15 for detecting the sideways acceleration acting on the vehicle, and a steering angle sensor 19 for detecting the steering angle. The roll rate sensor 13, the sideways acceleration sensor 15, and the steering angle sensor 19 are connected to a control circuit 17.

The side impact sensor 12 is disposed in the vicinity of the bottom end portion of a center pillar 18 (a B pillar). The side impact sensor 12 detects a side impact state when a side impact load of a predetermined value or more is applied to the side portion of the vehicle. A commonly known sensor, for example, of the type for detecting the velocity of an angle of rotation using Coriolis force is used as the roll rate sensor 13. The mean value of the detected voltage after rectification is taken as the roll rate (RR) and is output to the control circuit 17. A steering sensor formed, for example, from a slit board press-inserted in the steering shaft and two or three pairs of photo-interrupters mounted on the steering tube is used as the steering sensor 19. This steering sensor outputs the detected pulse signal to the control circuit 17. Note that an acceleration sensor for detecting the force generated in a predetermined mass in accordance with the rotation around the longitudinal axis of the vehicle, a gas gyro, or the like may also be used as the roll rate sensor 13.

The inflator 14 is disposed in the vicinity of the connection between the front pillar 20 (A pillar) and the instrument panel 22 and is connected with the aforementioned control circuit 17. Accordingly, the inflator 14 is operated by a signal output from the control circuit 17.

Figure 4:
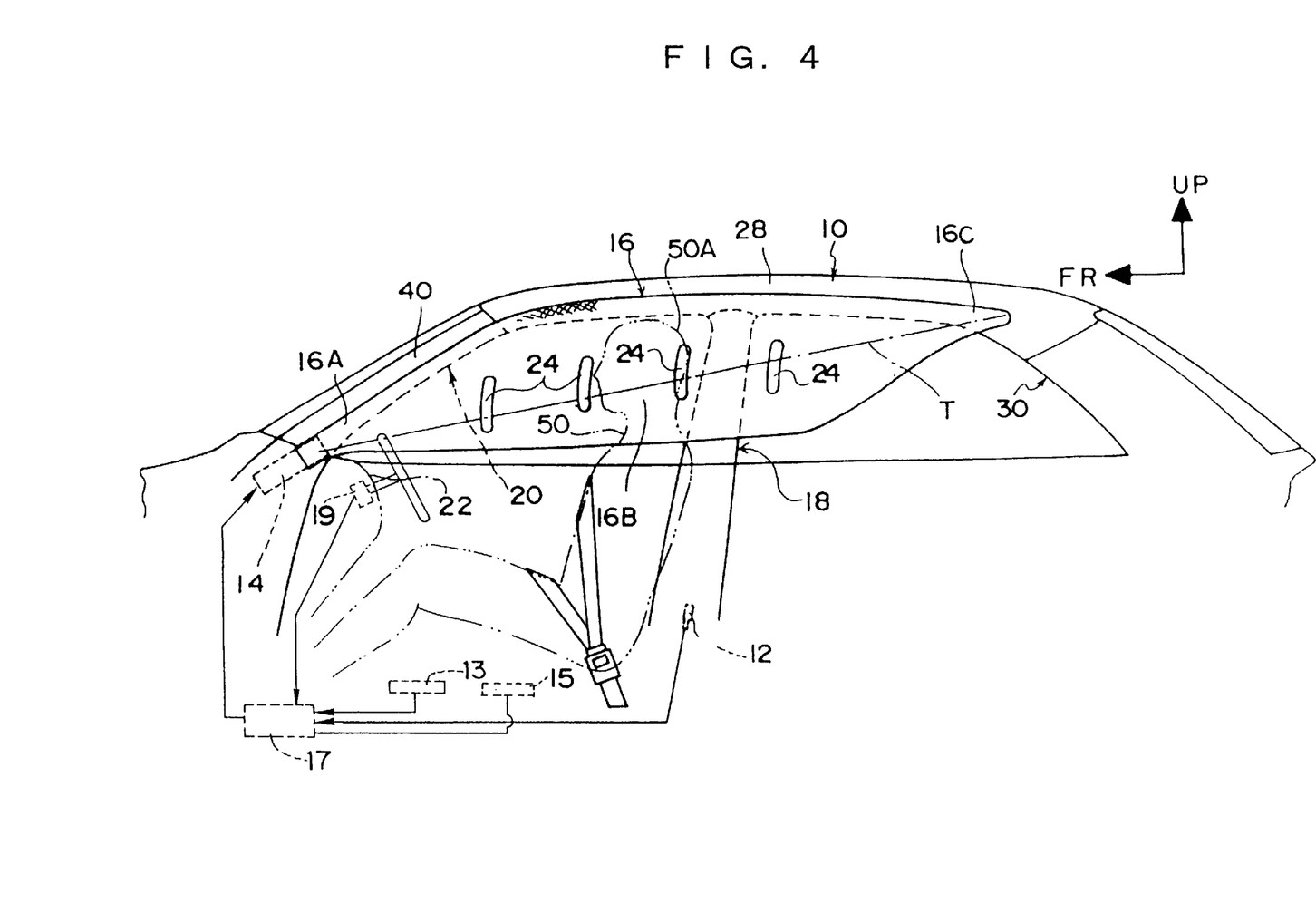
FIG. 4 is a schematic structural diagram corresponding to FIG. 3 showing the expanded state of an air bag body in the roll over determining method according to the first embodiment of the present invention.

In the expanded state thereof shown in FIG. 4, the airbag body 16 substantially forms a parallelogram shape. A plurality of non-expanding portions 24, having the longitudinal direction thereof running in the vertical direction of the airbag body 16, are formed at predetermined intervals intersecting a tension line T connecting the front and rear fixed points of the air bag body 16 in the middle portion vertically thereof as seen from the side.

In the stored state thereof shown in FIG. 3, the air bag body 16 is folded in a predetermined manner into an elongated shape and extends along the front pillar 20 and the roof side rail 28. More specifically, the front end portion 16A of the air bag body 16 is disposed at a position where the inflator is provided so that the gas ejected from the inflator 14 is able to flow into the air bag body 16, the middle portion 16B of the air bag body 16 is disposed alongside the front pillar 20 and the roof side rail 28, while the rear end portion 16C of the air bag body 16 is disposed in the vicinity of the quarter pillar 30 (C pillar).

Figure 2:
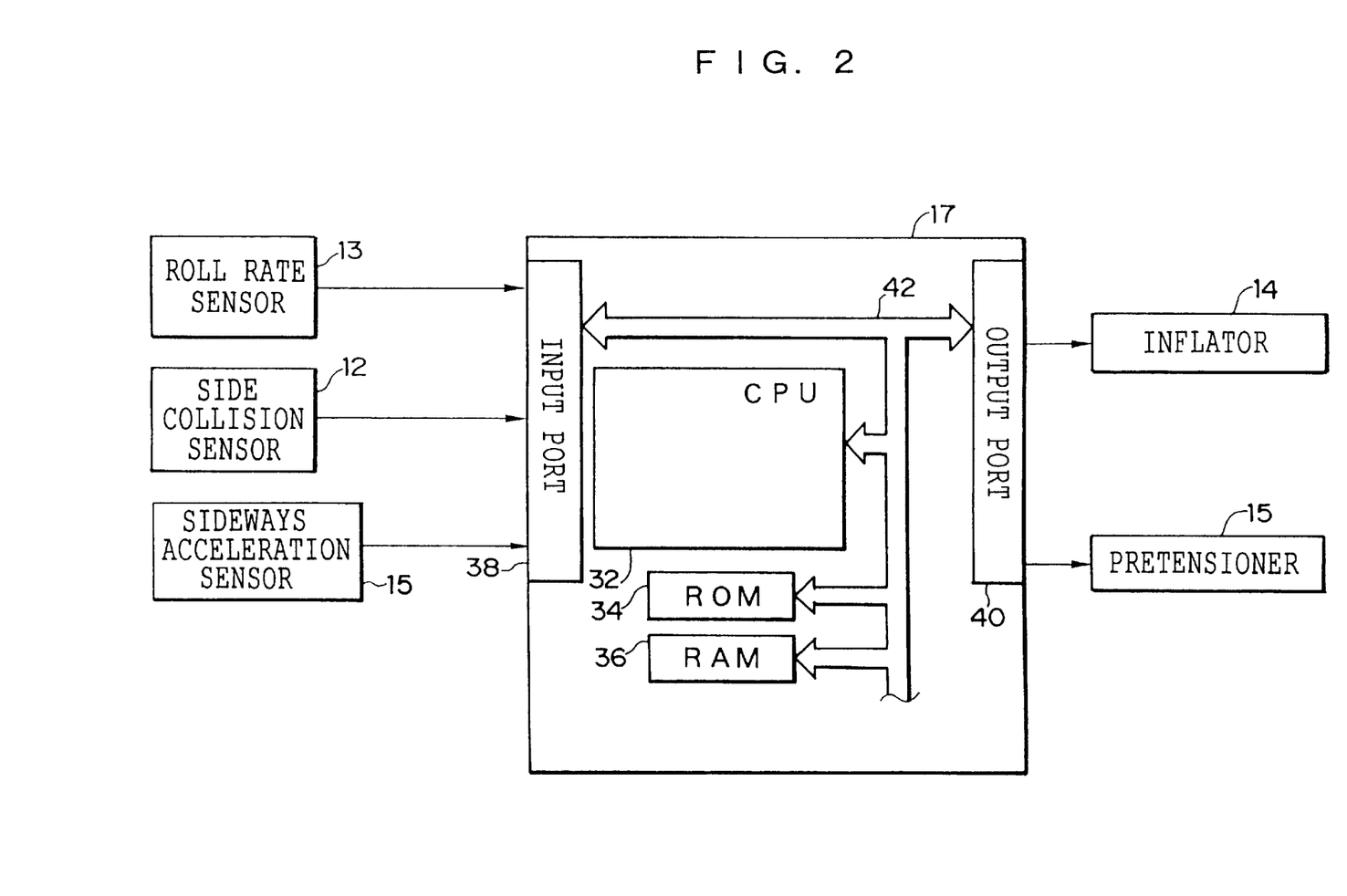
FIG. 2 is a block diagram showing the structure of the control system in the roll over determining method according to the first embodiment of the present invention.

As is shown in FIG. 2, the control circuit 17 is equipped with a commonly known CPU 32, ROM 34, RAM 36, an input port 38, an output port 40, and a bus 42 which connects each part. The CPU 32 executes the control program stored in the ROM 34.

Next, the operation of the present embodiment will be explained in accordance with the flow chart shown in FIG. 1.

Figure 1:
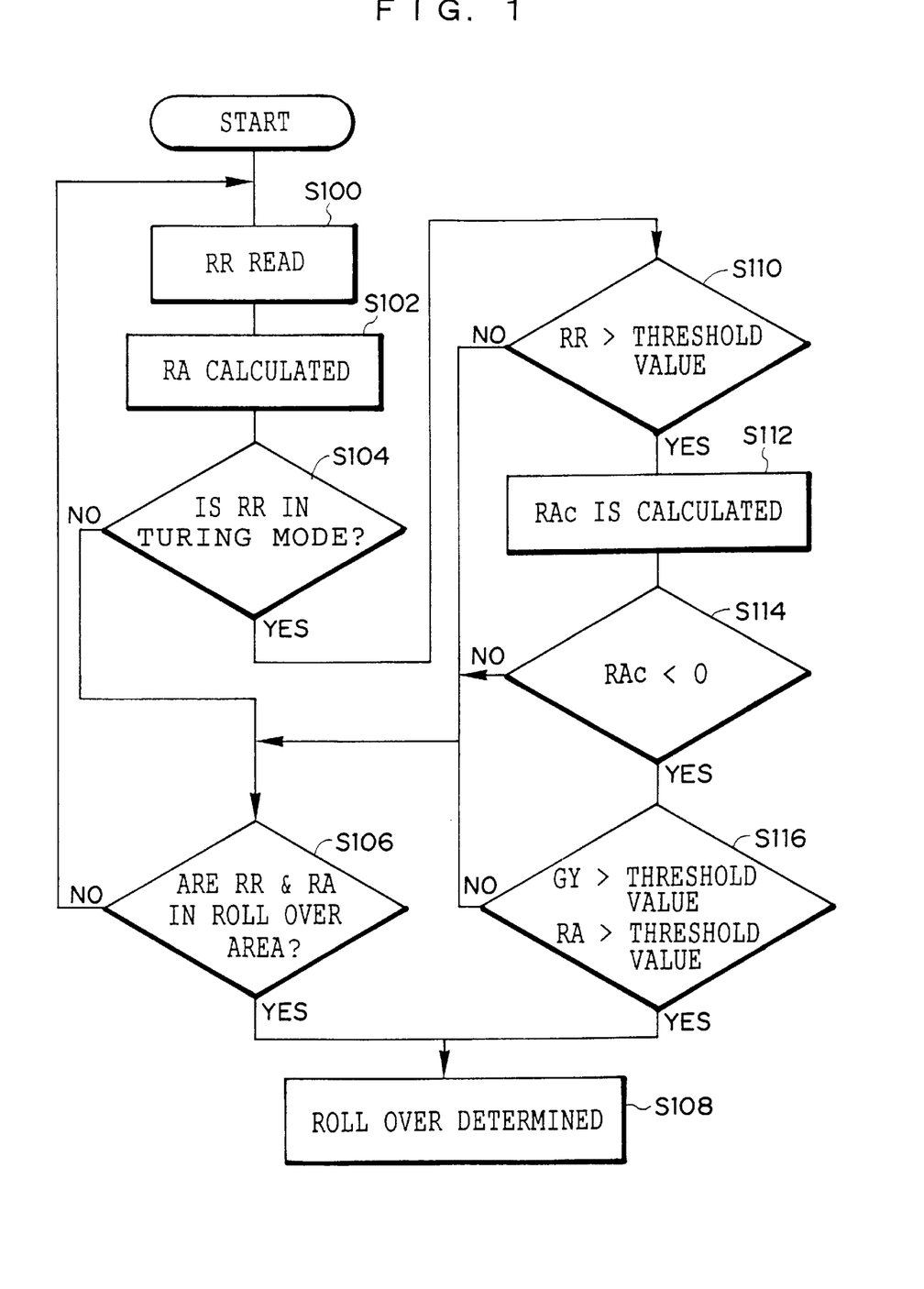
FIG. 1 is a flow chart showing control in the roll over determining method according to the first embodiment of the present invention.

The process routine shown in FIG. 1 is executed in the control circuit 17 of the present embodiment.

Firstly, in step 100 (in FIG. 1, S100), the roll rate (RR) is read from the roll rate sensor 13 and measurement of the roll rate is carried out. In this roll rate measurement process, correction of the zero drift is performed by a commonly known calculating means and the roll rate after correction is obtained.

Next, in step 102, the roll angle (RA) is calculated using commonly known integral calculation on the basis of the roll rate.

Next, in step 104, determination is made as to whether or not the vehicle is in turning mode. Namely, if, for example, on the basis of the input from the steering angle sensor 19, a steering angle of a predetermined value or more continues for a predetermined time or more, then it is determined that the vehicle is in turning mode.

If, as a result of this determination, it is determined that the vehicle is not in turning mode, the process moves to step 106.

Figure 5:
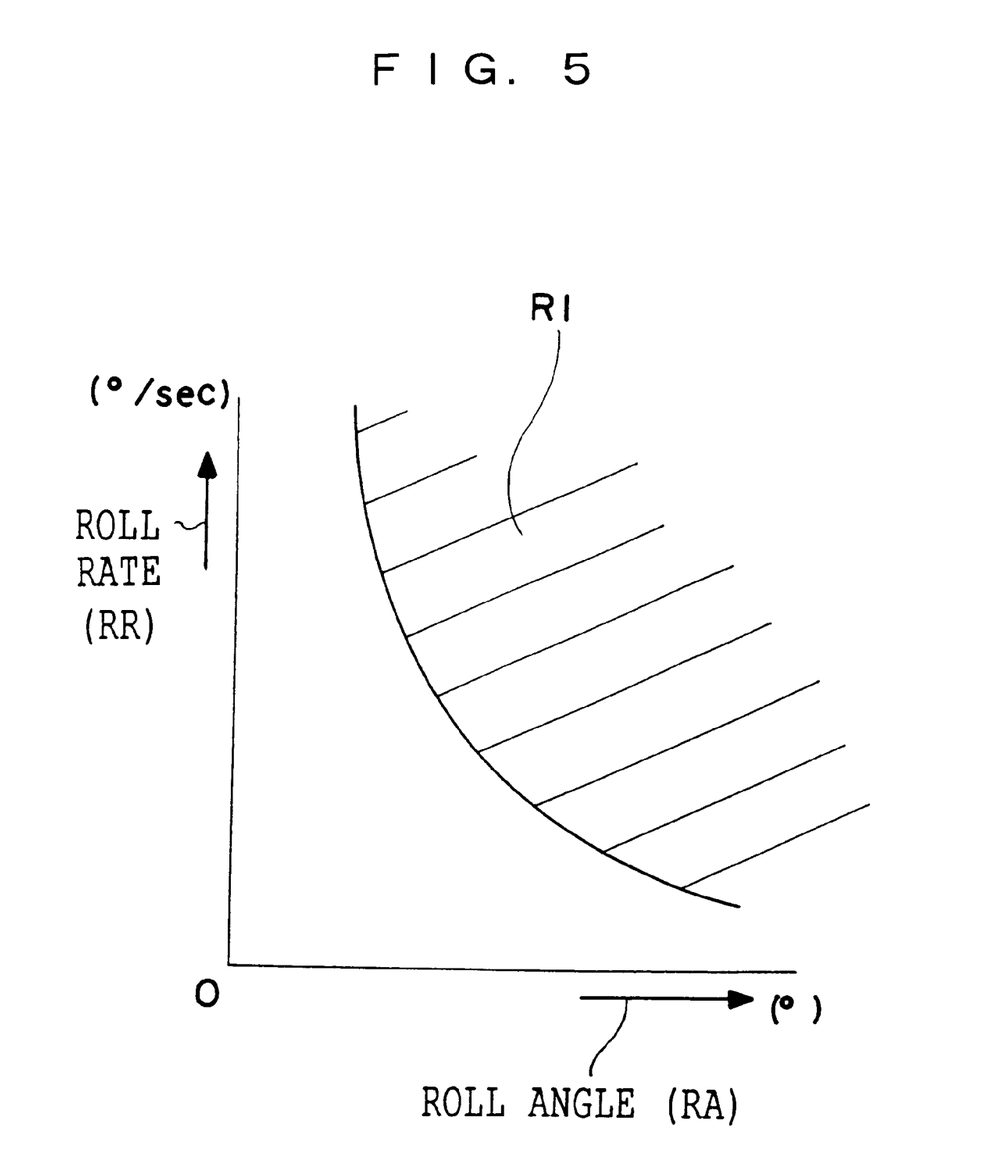
FIG. 5 is a determining map showing a relationship between roll angle and roll rate in the roll over determining method according to the first embodiment of the present invention.

Next, in step 106, it is determined from the relationship between the roll rate (RR) and the roll angle (RA) whether or not the state of the vehicle falls within the roll over area (the area R1 marked by the diagonal lines in FIG. 5) of the determining map shown in FIG. 5. Note that this determining map has been stored in advance in the ROM 34.

If it is then determined in step 106 that the state of the vehicle does fall within the roll over area, the process moves to step 108, roll over is determined and the inflator is operated.

If, on the other hand, it is determined in step 104 that the vehicle is in turning mode, the process moves to step 110 where it is determined whether or not the roll rate (RR) is greater than a threshold value. If, as a result, it is determined that the roll rate (RR) is not greater than the threshold value, the process moves to step 106. Note that this threshold value has been stored in advance in the ROM 34.

If, on the other hand, it is determined in step 110 that the roll rate (RR) is greater than the threshold value, the process moves to step 112. In step 112, the roll angle acceleration (RAc) is calculated using commonly known differential calculation on the basis of the roll rate (RR).

Next, in step 114, determination is made as to whether or not the roll angle acceleration is negative (RAc<0) and if it is determined that the roll angle acceleration (RAc) is not negative, the process moves to step 106.

Figure 6:
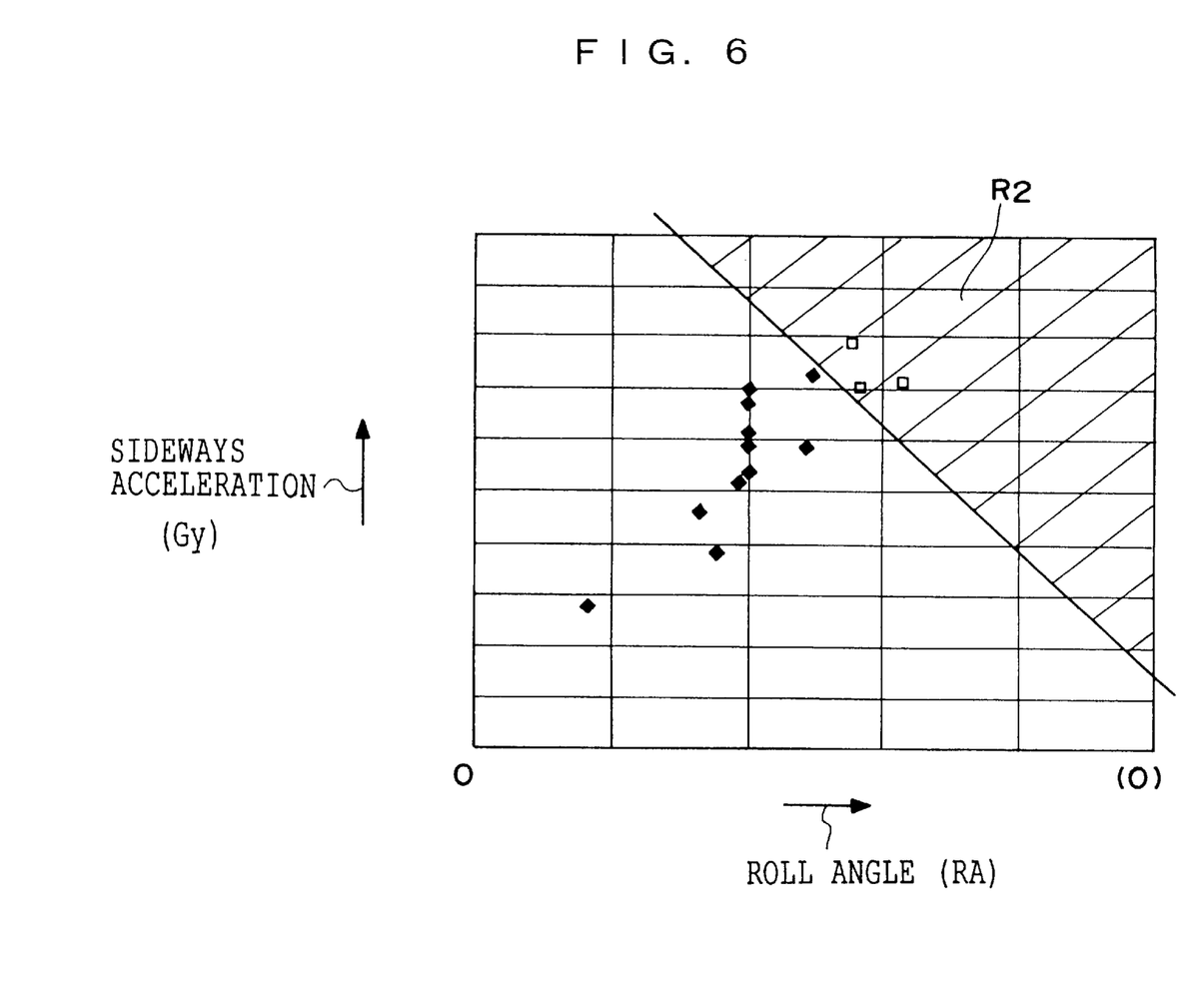
FIG. 6 is a determining map showing a relationship between roll angle and sideways acceleration in the roll over determining method according to the first embodiment of the present invention.

If, on the other hand, it is determined in step 114 that the roll angle acceleration (RAc) is negative, the process moves to step 116 where it is determined from the relationship between the sideways acceleration (Gy) and the roll angle (RA) whether or not the state of the vehicle falls within the roll over area (the area R2 marked by the diagonal lines in FIG. 6) of the determining map shown in FIG. 6. More specifically, if the relationship between the sideways acceleration (Gy) and the roll angle (RA) is in a map position shown by a black rectangle in FIG. 6, it is determined that the state of the vehicle is not within the roll over area. If, however, the relationship between the sideways acceleration (Gy) and the roll angle (RA) is in a map position shown by a white rectangle in FIG. 6, it is determined that the state of the vehicle is within the roll over area. Note that this determining map has been stored in advance in ROM 34. If, as a result, it is determined that the state of the vehicle is not within the roll over area, the process moves to step 106.

If, on the other hand, it is determined in step 116 that the state of the vehicle is within the roll over area, the process moves to step 108, roll over is determined, and the inflator 14 is operated.

Accordingly, in the present embodiment, when the vehicle is not in turning mode and the relationship between the roll rate (RR) and roll angle (RA) is inside the head-protecting air bag device operating map area (area R1) shown in FIG. 5, the control circuit 17 operates the inflator 14 and the air bag body 16 is expanded.

Moreover, if the relationship between the roll rate (RR) and the sideways acceleration (Gy) is inside the head-protecting air bag device operating map area (area R2) shown in FIG. 6 and the vehicle is in turning mode, then the control circuit operates the inflator 14 and the air bag body 16 is expanded.

As a result, by adding the sideways acceleration (Gy) to the elements determining whether or not a vehicle will roll over when the vehicle is in turning mode, the swinging of the vehicle occupant towards the side of the vehicle caused by the sideways acceleration of the vehicle can be taken into consideration and roll over can be detected early. Therefore, the air bag 10 can be operated before the vehicle occupant is swung towards the outer side of the vehicle and the gap between the vehicle occupant and the side portion of the vehicle is narrowed.

Moreover, in general, when a vehicle rolls over while in turning mode, firstly the vehicle begins to roll with respect to the sprung weight of the vehicle. If, after that, the vehicle turns further, the vehicle then begins to roll with respect to the unsprung weight of the vehicle. It is known that the effect of this is that the roll rate (RR) is reversed. This roll rate (RR) reversal is shown as the point P1 of the time T1 in the graph in FIG. 7. The roll rate (RR) is also reversed at the point P2 of the time T0, however, in this case, the vehicle is not in turning mode and therefore the processes after step 110 are not performed.

Figure 7:
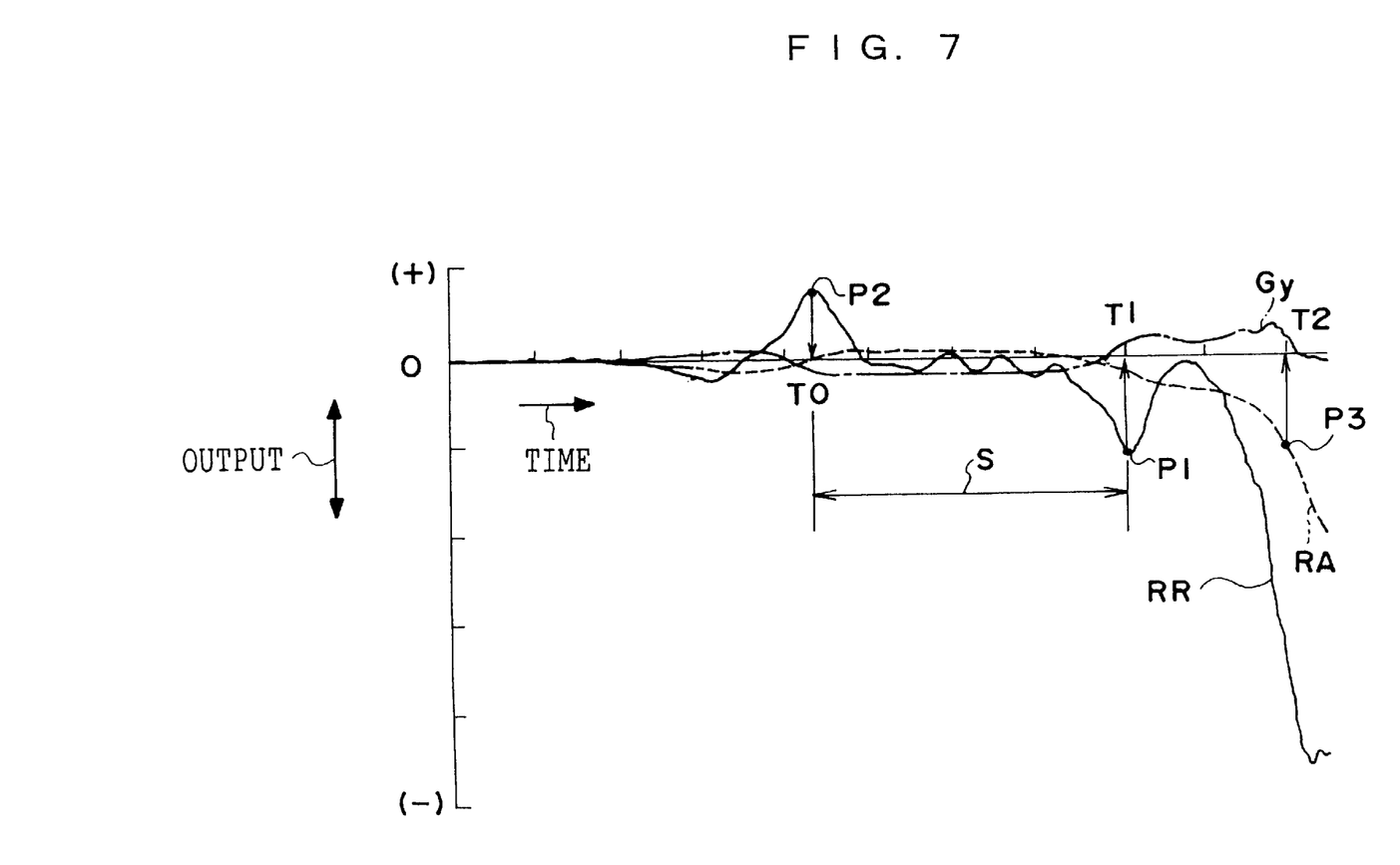
FIG. 7 is a graph showing the output waveforms of roll rate, roll angle, and sideways acceleration in the roll over determining method according to the first embodiment of the present invention.

The vehicle occupant is swung towards the outer side of the vehicle in the transverse direction thereof by the sideways acceleration which is generated slightly after the roll rate (RR) reversal.

Accordingly, in the present embodiment, in order to detect the time when the roll rate (RR) reverses, a determination is made in step 114 as to whether or not the roll angle acceleration (RAc) is negative (RAc<0). At the time when the roll angle acceleration (RAc) is determined to be negative (RAc<0), the process moves to step 116 and it is determined whether or not the state of the vehicle is in the roll over area.

As a result, as is shown in FIG. 7, at the time (T2) of the point P3 when the roll angle (RA) exceeds a predetermined threshold value, the time (T1) of the detection in the roll over determining method of the present embodiment is faster than the roll over determining method which determines that the state of the vehicle is within the roll over area. Therefore, roll over can be detected with certainty and the air bag device 10 operated before the vehicle occupant is swung towards the outer side of the vehicle in the transverse direction thereof by the increase in the sideways acceleration of the vehicle which is generated slightly after the roll rate reversal.

The explanation given in detail above was for a specific embodiment of the present invention, however, the embodiments of the present invention are not limited to this, and it is clear to those skilled in the art that various other embodiments are possible within the range of the present invention. For example, in the present embodiment, it is determined that the vehicle is in turning mode when a steering angle of a predetermined value or more continues for a predetermined time or more on the basis of the input from the steering angle sensor 19. However, the method of determining whether or not the vehicle is in turning mode is not limited to this and, for example, as is shown in FIG. 7, it may be determined that the vehicle is in turning mode when the time S between the time (T0) of a roll rate (RR) reversal and the time (T1) of the next roll rate reversal is shorter than a predetermined time (S<S0).

As was explained above, the roll over determining method according to the first aspect of the present invention possesses the excellent effect of being able to make an early detection of roll over.

In addition, the roll over determining method according to the second aspect of the present invention, in addition to the effects of the first aspect, possesses the excellent effect of being able to make an early detection of roll over before the gap between the vehicle occupant and the side of the vehicle changes.

The above-described head-protecting airbag device is used as an example and the head-protecting airbag device may be, for example, a head-protecting airbag device, which rear end of the air bag body is connected to an inflator provided in the vicinity of a quarter pillar (at the rear of the vehicle), and which, in an expanded state of the air bag body, covers the rear side window and the front side window, thus protecting the heads of occupants of both the front and rear seats of the vehicle.

What is claimed is:

1. A roll over determining method comprising:

a turning mode determining step for determining whether or not a vehicle is turning;

a roll rate determining step for determining whether or not the roll rate of the vehicle exceeds a predetermined value; and a roll over determining step for determining whether or not the vehicle is in a roll over state, wherein if it is determined in said turning mode determining step that the vehicle is turning and it is determined in said roll rate determining step that the roll rate exceeds the predetermined value, the determining of said roll over determining step is executed on the basis of the relationship between a sideways acceleration of the vehicle and a roll angle of the vehicle.

2. The roll over determining method according to claim 1, wherein the determining in said roll over determining step is executed on the basis of a determining map in which the relationship between the sideways acceleration of the vehicle and the roll angle of the vehicle is determined in advance.

3. The roll over determining method according to claim 1, further comprising a roll rate reversal determining step for determining whether or not the roll rate is reversed.

4. The roll over determining method according to claim 3, wherein the determining in said roll rate reversal determining step is executed on the basis of a roll angle acceleration of the vehicle.

5. The roll over determining method according to claim 4, wherein, in said roll rate reversal determining step, the roll rate is determined to have reversed if the roll angle acceleration is negative.

6. The roll over determining method according to claim 3, wherein if it is determined in said turning mode determining step that the vehicle is turning, and it is determined in said roll rate determining step that the roll rate exceeds the predetermined value, and it is further determined in said roll rate reversal determining step that the roll rate is reversed, then the determining of said roll over determining step is executed on the basis of the relationship between the sideways acceleration and the roll angle.

7. The roll over determining method according to claim 1, wherein, in said turning mode determining step, the vehicle is determined to be turning if a steering angle of the vehicle remains above a predetermined value for a predetermined time.

8. The roll over determining method according to claim 1, wherein, in said turning mode determining step, the vehicle is determined to be turning if the time interval between a first roll rate reversal and a second roll rate reversal is less than a predetermined length of time.

9. The roll over determining method according to claim 1, wherein, if it is determined in said turning mode determining step that the vehicle is not turning, the determining of said roll over determining step is executed on the basis of the relationship between the roll rate and the roll angle.

10. The roll over determining method according to claim 1, wherein, if it is determined in said roll rate determining step that the roll rate does not exceed the predetermined value, the determining of said roll over determining step is executed on the basis of the relationship between the roll rate and the roll angle.

11. The roll over determining method according to claim 3, wherein, if it is determined in said roll rate reversal determining step that the roll rate is not reversed, the determining of the roll over determining step is executed on the basis of the relationship between the roll rate and the roll angle.

12. A roll over determining method comprising:

a roll rate detecting step for detecting a roll rate of a vehicle;

a roll angle detecting step for detecting a roll angle of the vehicle;

a sideways acceleration detecting step for detecting a sideways acceleration of the vehicle;

a roll rate determining step for determining whether or not the roll rate exceeds a predetermined value;

a turning mode determining step for determining whether or not the vehicle is turning; and a roll over determining step for determining whether or not the vehicle is in a roll over state, wherein, if it is determined in said turning mode determining step that the vehicle is turning, and it is determined in said roll rate determining step that the roll rate exceeds the predetermined value, the determining of said roll over determining step is executed on the basis of the relationship between the sideways acceleration of the vehicle and the roll angle of the vehicle, and wherein, if it is determined in said turning mode determining step that the vehicle is not turning, then the determining of said roll over determining step is executed on the basis of the relationship between the roll rate and the roll angle.

13. The roll over determining method according to claim 12, further comprising a roll rate reversal determining step for determining whether or not the roll rate is reversed, wherein, if it is determined in said turning mode determining step that the vehicle is turning, and it is determined in said roll rate determining step that the roll rate exceeds the predetermined value, and it is further determined in said roll rate reversal determining step that the roll rate is reversed, the determining of said roll over determining step is executed on the basis of the relationship between the sideways acceleration and the roll angle.

* * * * *